United States Patent
Jiang et al.

(10) Patent No.: US 12,356,344 B2
(45) Date of Patent: Jul. 8, 2025

(54) MULTI-BEAM TRANSMISSION SIGNALING FOR UPLINK COMMUNICATION CHANNELS

(71) Applicant: ZTE CORPORATION, Guangdong (CN)

(72) Inventors: Chuangxin Jiang, Shenzhen (CN); Zhaohua Lu, Shenzhen (CN); Shujuan Zhang, Shenzhen (CN); Bo Gao, Shenzhen (CN); Hao Wu, Shenzhen (CN); Ke Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 17/876,891

(22) Filed: Jul. 29, 2022

(65) Prior Publication Data

US 2022/0369247 A1 Nov. 17, 2022

Related U.S. Application Data

(63) Continuation of application No. PCT/CN2020/138993, filed on Dec. 24, 2020.

(51) Int. Cl.
*H04W 52/54* (2009.01)
*H04W 52/32* (2009.01)
*H04W 72/21* (2023.01)

(52) U.S. Cl.
CPC ......... *H04W 52/54* (2013.01); *H04W 52/325* (2013.01); *H04W 72/21* (2023.01)

(58) Field of Classification Search
CPC . H04W 72/23; H04W 72/046; H04W 52/146; H04W 72/21; H04W 16/28;
(Continued)

(56) References Cited

U.S. PATENT DOCUMENTS

| 10,687,319 B2 | 6/2020 | Babaei et al. |
| 2020/0383061 A1 | 12/2020 | Yang et al. |
| 2023/0085606 A1* | 3/2023 | Shao ..................... H04L 5/0012 370/329 |

FOREIGN PATENT DOCUMENTS

| CN | 101646229 A | 2/2010 |
| CN | 102291812 B | 12/2014 |

(Continued)

OTHER PUBLICATIONS

Qualcomm Incorporated: "Enhancements on Multi-TRP for PDCCH, PUCCH and PUSCH", 3GPP Draft; R1-2006791, 3rd Generation Partnership Project (3GPP), Mobile Competence Centre ; 650, Route Des Lucioles ; F-06921 Sophia-Antipolis Cedex.*

(Continued)

*Primary Examiner* — Golam Sorowar
(74) *Attorney, Agent, or Firm* — Foley & Lardner LLP

(57) ABSTRACT

Presented are systems, methods, apparatuses, or computer-readable media for multi-beam transmission signaling for uplink communication channels. A wireless communication device may receive, from a wireless communication node, B candidate groups of power control parameters. The wireless communication device may receive, from the wireless communication node, a first signaling to indicate the B candidate groups of power control parameters for a first physical uplink control channel (PUCCH) resource. B may be an integer greater than or equal to 1.

19 Claims, 12 Drawing Sheets

(58) Field of Classification Search
CPC ... H04W 52/242; H04W 80/02; H04W 52/08; H04W 72/53; H04W 56/001; H04W 72/0446; H04W 24/10; H04W 76/11; H04W 52/10; H04W 72/0453; H04W 72/1273; H04W 52/241; H04W 52/245; H04W 52/50; H04W 72/0473; H04W 74/0833; H04W 52/365; H04W 52/42; H04B 7/0695; H04B 7/088; H04B 7/0617; H04B 7/0626; H04B 7/0404; H04B 7/0408; H04B 7/0619; H04B 7/0417; H04B 7/0456; H04B 7/06964; H04B 7/06966; H04B 7/0639; H04B 7/022; H04B 17/327; H04B 7/086; H04B 17/17; H04B 17/318; H04B 7/0413; H04B 7/0691; H04L 5/0053; H04L 5/0048; H04L 5/0094; H04L 5/0023; H04L 5/001; H04L 5/0051; H04L 5/0091; H04L 5/005; H04L 5/0055; H04L 5/0044; H04L 1/0026; H04L 5/0007; H04L 5/0092; H04L 1/1822; H04L 1/1854; H04L 1/1861; H04L 5/0064; H04L 5/0098; H04L 1/1896; H04L 25/0226

See application file for complete search history.

(56) References Cited

FOREIGN PATENT DOCUMENTS

| CN | 111901870 A | * | 11/2020 | ............ H04B 1/713 |
|---|---|---|---|---|
| WO | WO-2014/108050 A1 | | 7/2014 | |
| WO | WO-2018/083536 A1 | | 5/2018 | |
| WO | WO-2021101538 A1 | * | 5/2021 | ........... H04B 17/382 |

OTHER PUBLICATIONS

Catt, "Discussion on enhancement on multi-beam operation" 3GPP TSG RAN WG1 #103-e, R1-2007824, Oct. 26, 2020, e-Meeting (10 pages).

Convida Wireless, "Multi-TRP Enhancements for PDCCH, PUCCH and PUSCH" 3GPP TSG-RAN WG1#103-e, R1-2009159, Oct. 26, 2020, e-Meeting (6 pages).

Ericsson, "On PDCCH, PUCCH and PUSCH enhancements with multiple TRPs" 3GPP TSG-RAN WG1 Meeting #103, R1-2009223, Oct. 26, 2020, e-Meeting (28 pages).

Fraunhofer Iis et al., "Enhancements on multi-beam operation" 3GPP TSG RAN WG1 Meeting #103-e, R1-2008899, Nov. 2, 2020, e-Meeting (6 pages).

Intel Corporation, "Enhancements on Multi-Beam Operation" 3GPP TSG RAN WG1 #103-e, R1-2008977, Oct. 26, 2020, e-Meeting (16 pages).

Interdigital Inc., "Discussions on Multi-beam Enhancement" 3GPP TSG RAN WG1 #103-e, R1-2007626, Aug. 17, 2020, e-Meeting (12 pages).

International Search Report and Written Opinion for PCT Appl. No. PCT/CN2020/138993, mailed Sep. 24, 2021 (7 pages).

Lenovo et al., "Enhancements on Multi-beam Operation" 3GPP TSG RAN WG1#103-e, R1-2008910, Oct. 26, 2020, e-Meeting (10 pages).

LG Electronics, "Enhancements on Multi-beam Operation" 3GPP TSG RAN WG1 #103-e, R1-2008573, Oct. 26, 2020, e-Meeting (11 pages).

Oppo, "Enhancements on Multi-Beam Operation" 3GPP TSG RAN WG1 #103-e, R1-2008217, Oct. 26, 2020, e-Meeting (11 pages).

Qualcomm Incorporated, "Enhancements on Multi-TRP for PDCCH, PUCCH and PUSCH" 3GPP TSG-RAN WG1 Meeting #103-e, R1-2009251, Oct. 26, 2020, e-Meeting (33 pages).

Vivo, "Further discussion on multi beam enhancement" 3GPP TSG RAN WG1 #103-e, R1-2007644, Oct. 26, 2020, e-Meeting (26 pages).

ZTE, "Multi-TRP enhancements for PDCCH, PUCCH and PUSCH" 3GPP TSG RAN WG1 Meeting #103-e, R1-2007764, Oct. 26, 2020, e-Meeting (22 pages).

Extended European Search Report for EP Appl. No. 20966469.7, dated Jan. 30, 2024 (9 pages).

Qualcomm Incorporated, "Enhancements on Multi-TRP for PDCCH, PUCCH and PUSCH", 3GPP TSG-RAN WG1 Meeting #102-e, R1-2006791, Aug. 28, 2020, e-Meeting (14 pages).

* cited by examiner

MULTI-BEAM TRANSMISSION SIGNALING FOR UPLINK COMMUNICATION CHANNELS

CROSS-REFERENCE TO RELATED APPLICATION

This application claims the benefit of priority under 35 U.S.C. § 120 as a continuation of PCT Patent Application No. PCT/CN2020/138993, filed on Dec. 24, 2020, the disclosure of which is incorporated herein by reference in its entirety.

TECHNICAL FIELD

The disclosure relates generally to wireless communications, including but not limited to systems and methods for multi-beam transmission signaling for uplink (UL) communication channels.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may receive, from a wireless communication node, B candidate groups of power control parameters. The wireless communication device may receive, from the wireless communication node, a first signaling to indicate the B candidate groups of power control parameters for a first physical uplink control channel (PUCCH) resource. B may be an integer greater than or equal to 1 (e.g., B=2)

In some embodiments, a $b^{th}$ candidate group of power control parameters, from the B candidate groups, may be at least one of configured by higher layer signaling or includes a $b^{th}$ predefined value from each of a plurality of sets of configured power control parameters. In some embodiments, b may be an integer greater than or equal to 1, and smaller than or equal to B, and each of the plurality of sets of the configured power control parameters may correspond to a set of pathloss reference signals (RSs), a set of p0 values, or a set of closed loop indices.

In some embodiments, the first signaling may indicate one of at least three values. The three values may correspond to a first candidate group, a second candidate group, or both the first candidate group and the second candidate group, from the B candidate groups of power control parameters. In some embodiments, the first value may indicate that all PUCCH transmission instances of the first PUCCH resource are associated with the first candidate group of power control parameters. In some embodiments, the second value may indicate that all PUCCH transmission instances of the first PUCCH resource are associated with the second candidate group of power control parameters. In some embodiments, the third value may indicate that a first subset of PUCCH transmission instances of the first PUCCH resource are associated with the first candidate group of power control parameters, and a second subset of PUCCH transmission instances of the first PUCCH resource are associated with the second candidate group of power control parameters In some embodiments, the first PUCCH resource may be configured in B PUCCH resource groups from M PUCCH resource groups. M may be greater than or equal to B, and each of the M PUCCH resource groups may be associated with at least one of: same power control parameters, or a same beam state (e.g., =2, 2<=M<=4 or 2<=M<=8, all PUCCH resources within each of the same PUCCH group are the same power control parameters).

In some embodiments, the wireless communication device may receive, from the wireless communication node, a medium access control control element (MAC CE) signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B. In high frequency range (FR2), a beam state may include a candidate group of power control parameters.

In some embodiments, the identified (G+1)th candidate group of power control parameters or the identified (G+1)th beam state may be used for all PUCCH resources of a (G+1)th PUCCH resource group from the B PUCCH resource groups, that includes the first PUCCH resource. In some embodiments, the identifier G may include at least one of a bit in an octet that includes an identifier (ID) of the first PUCCH resource, or a bit in another octet that includes a spatial relation information ID for the first PUCCH resource.

At least one aspect is directed to a system, a method, an apparatus, or a computer-readable medium. A wireless communication node may transmit, to a wireless communication device, B candidate groups of power control parameters. The wireless communication node may transmit, to the wireless communication device, a first signaling to indicate the B candidate groups of power control parameters for a first physical uplink control channel (PUCCH) resource, wherein B is an integer greater than or equal to 1.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
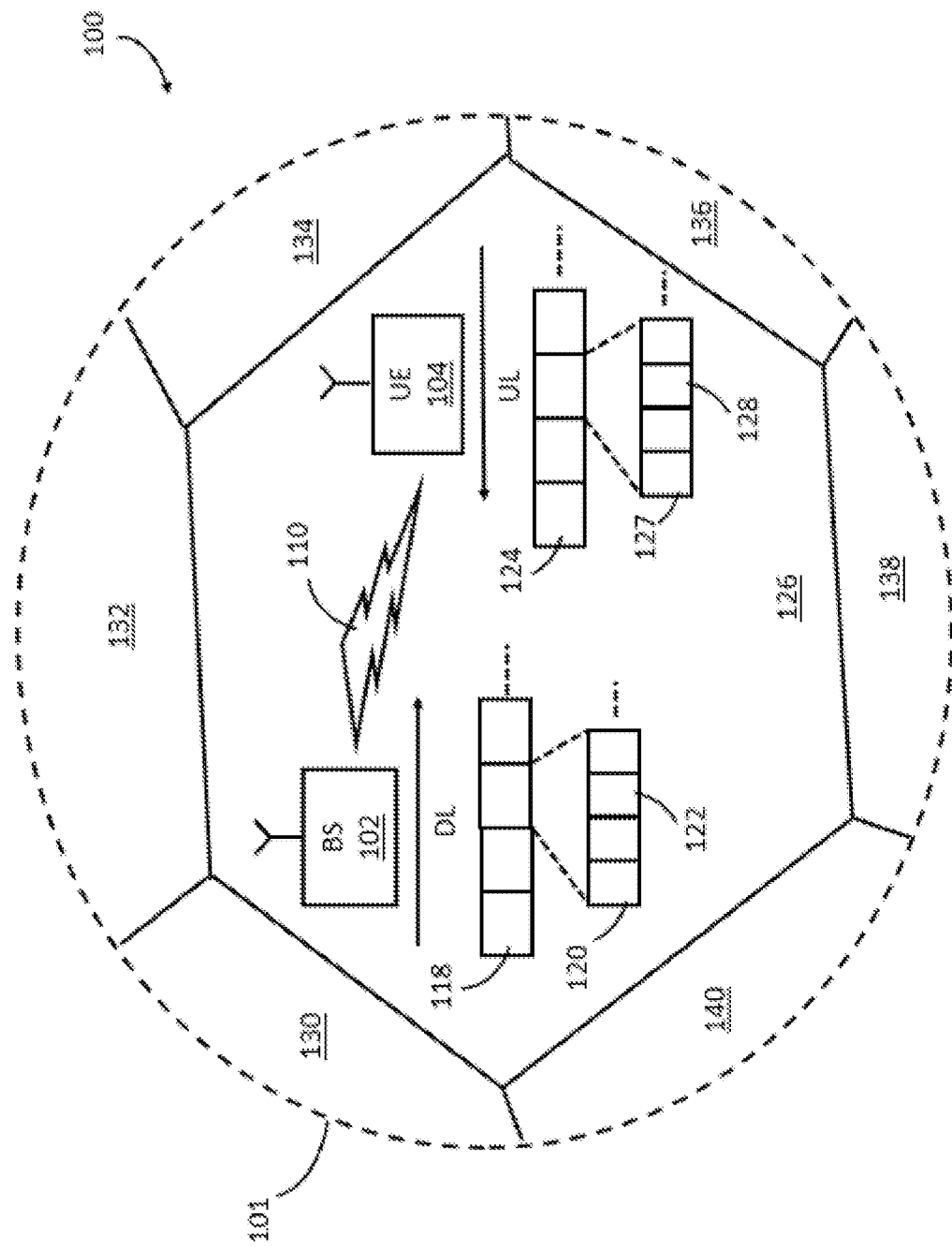
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
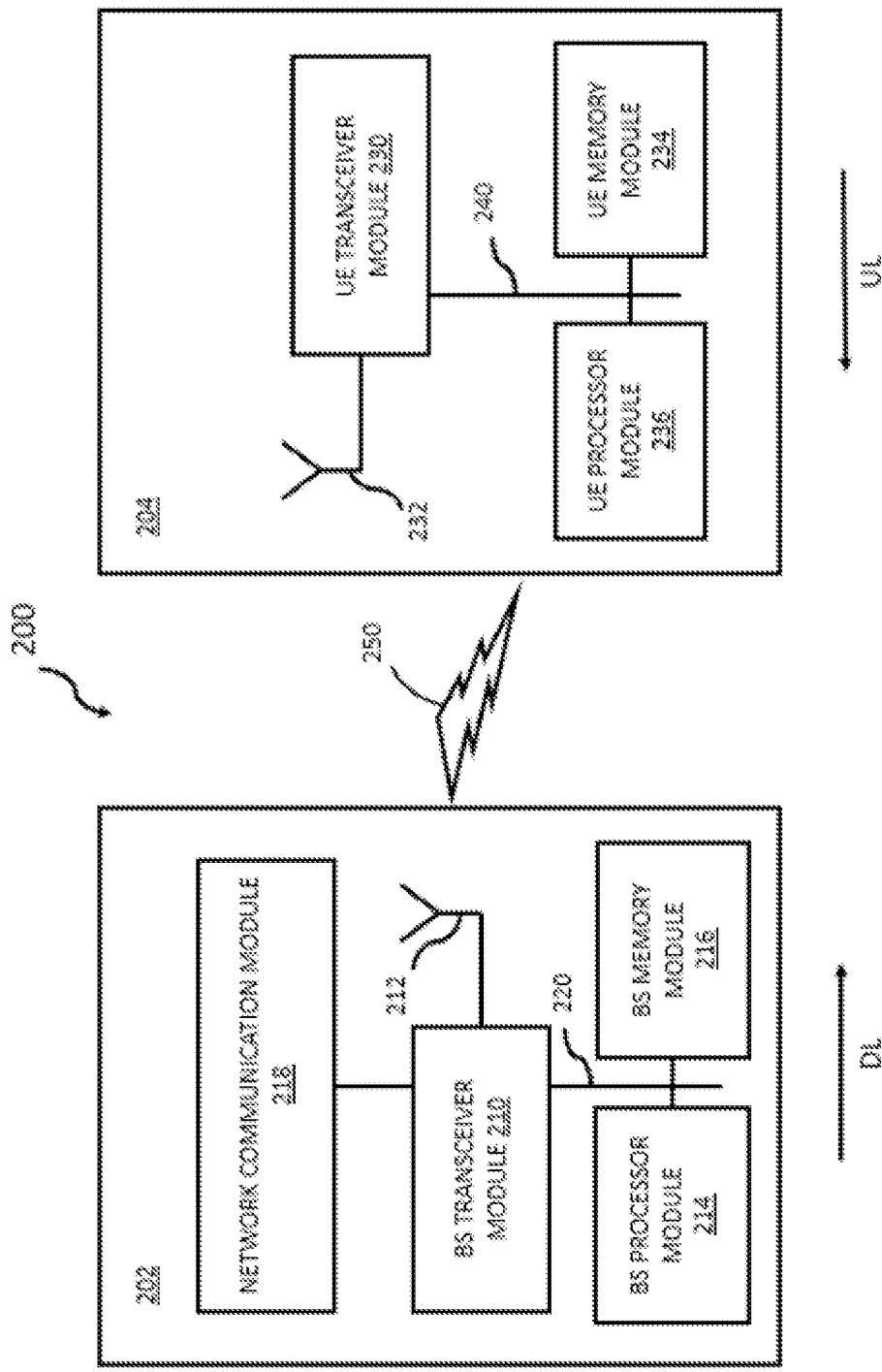
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuity that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Systems and Methods for Multi-Beam Transmission Signaling for Uplink Communication Channels Under some approaches, in new radio (NR) transmission mechanisms, one physical uplink control channel (PUCCH) resource may only be configured with single beam or single group of power control parameters. In high frequency range, where multiple PUCCH occasions or frequency hops are scheduled by one DCI towards to multiple beam directions in order to achieve beam diversity gain, other approaches to signaling design may be carried out.

Transmissions over wireless channels may be subject to errors such as variations in signal quality, high noise, or a high interference level, among others. Hybrid Automatic Repeat Request (HARQ) may rely on a combination of error-correcting coding and retransmission of erroneous data units. HARQ acknowledgements may be transmitted on a PUCCH (physical uplink control channel). In addition, other uplink control information (UCI), such as a scheduling request (SR) and channel state information (CSI), may also be transmitted on a PUCCH resource.

In NR schemes, PUCCH scheduled by a DCI may be mainly used for acknowledgement feedback (e.g., ACK/NACK), gNB can use radio resource control (RRC) signaling to configure multiple PUCCH resources, and further use PUCCH resource indicator (PRI) in downlink control information (DCI) to select one resource. One beam can be configured or activated for each PUCCH resource. Since different beams (e.g., spatial relationship information, transmission configuration indicator (TCI), or quasi-co-location (QCL) assumption) can be configured, activated, or updated for different PUCCH resources, dynamic beam selection may be supported based on PUCCH resource selection.

This approach may have better flexibility in lower frequency range (FR1). In higher frequency bands, beamforming may be a useful technique to compensate for the path loss. However, the beamforming signal in some directions may be blocked by obstructions (e.g., human body and other objects) between the user equipment (UE) and base station. Often, the blockage may be dynamically varying and unpredictable. Under other approaches, whether the PUCCH mechanism works well may be uncertain.

To support multi-beam transmission where multiple PUCCH occasions and frequency hops scheduled by one DCI towards to multiple beam directions, multiple candidate groups of power control parameters or multiple beams may be used. In FR2, each beam contains a candidate group of power control parameters, where each beam refers to one spatial relation information or one TCI state. In FR1, since there is no MAC CE to activate power control parameters, one or more of multiple candidate groups can be configured by RRC signaling or predefined. A radio resource control (RRC) signaling or media access control, control element (MAC CE) can include at least three states to indicate the first candidate group of power control parameters, the second candidate group of power control parameters, or both respectively. In some embodiments, a virtual spatial relation info can be configured for a PUCCH resource or resource group where the RS for beam information is not configured in the virtual PUCCH spatial relation info.

In facilitating PUCCH group-based MACCE for multi-beam transmission, both PUCCH resource ID and a relative PUCCH resource group ID b in a MACCE may be introduced to update or activate beams for one or more PUCCH resources. The relative PUCCH resource group ID b can be indicated by one dedicated bit in the octet with PUCCH Resource ID or one or two dedicated bits in the octet with Spatial Relation Info ID. The dedicated bit in the octet with PUCCH resource ID may be located before the bits for PUCCH Resource ID. The dedicated bit in the octet with Spatial Relation Info ID may be located before bits for Spatial Relation Info ID. The number of relative PUCCH resource groups for a PUCCH resource #i may be B. The PUCCH resource #i can be configured within B PUCCH groups. The relative PUCCH resource group ID b may be used to identify to which PUCCH resource group the corresponding Spatial Relation Info ID is used. The identified PUCCH resource group may include the corresponding PUCCH resource ID.

A. Multiple Beams Transmission in Frequency Range 2 (FR2)

Figure 3:
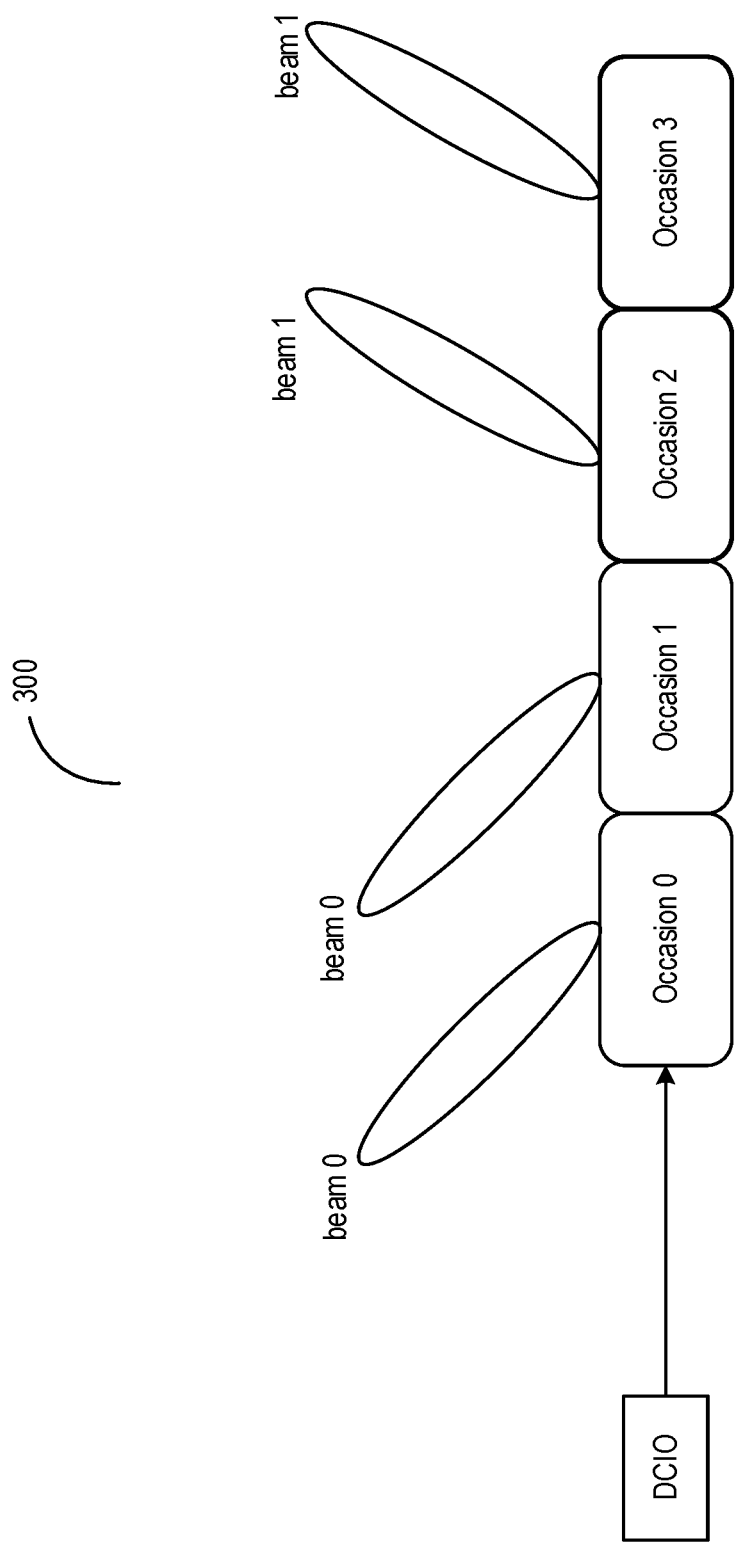
FIG. 3 illustrates a block diagram of a system for multiple beam transmission of physical uplink control channel (PUCCH) in accordance with an illustrative embodiment.

Referring now to FIG. 3, depicted is a block diagram of a system 300 for multiple beam transmission of physical uplink control channel (PUCCH). One enhancement relative to the single beam transmission approach may be to introduce multiple beam transmission. That is, for one PUCCH resource, multiple occasions or frequency hops of the same or different PUCCH occasions can be transmitted towards to different beam directions. PUCCH occasion(s) or frequency hops scheduled by one DCI may be divided into multiple groups associated with different beams or candidate groups of power control parameters.

In frequency range 2 (FR2), one PUCCH resource may be configured or activated with multiple beams wherein one beam corresponds to one spatial relation or one TCI state in FR2 or one candidate group of power control parameters (in FR1). Then, different frequency hops or occasions of the same PUCCH resource indicated by PRI can be associated with different beams.

Meanwhile, to save signaling overhead to activate or update beams for each PUCCH resource, all configured PUCCH resources can be divided into M groups. Resources within each group may have the same beam. The group may be informed by higher layer signaling. In such case, once a beam for a PUCCH resource #i to be activated or updated by a MAC CE, all PUCCH resources within the PUCCH group same as PUCCH resource #i may be activated or updated with the same beam as the PUCCH resource #i. One method for supporting one PUCCH resource activated or updated with multiple beams may be to allow one PUCCH resource to be configured within B PUCCH groups, $1<B<M$, e.g. $B=2$.

1. Using PUCCH Resource ID and PUCCH Resource Group ID in MAC-CE

In some embodiments, both PUCCH resource ID and PUCCH resource group ID m may be introduced in a media access control, control element (MAC CE) signaling to update or activate beam for one or more PUCCH resources, where 0<=m<M. The PUCCH resource group ID can be indicated by one dedicated bit in the octet with PUCCH Resource ID, or one or two dedicated bits in the octet with Spatial Relation Info ID. The dedicated bit in the octet with PUCCH resource ID may be located before bits for PUCCH Resource ID. The dedicated bit in the octet with Spatial Relation Info ID may be placed before bits for Spatial Relation Info ID.

Figure 4:
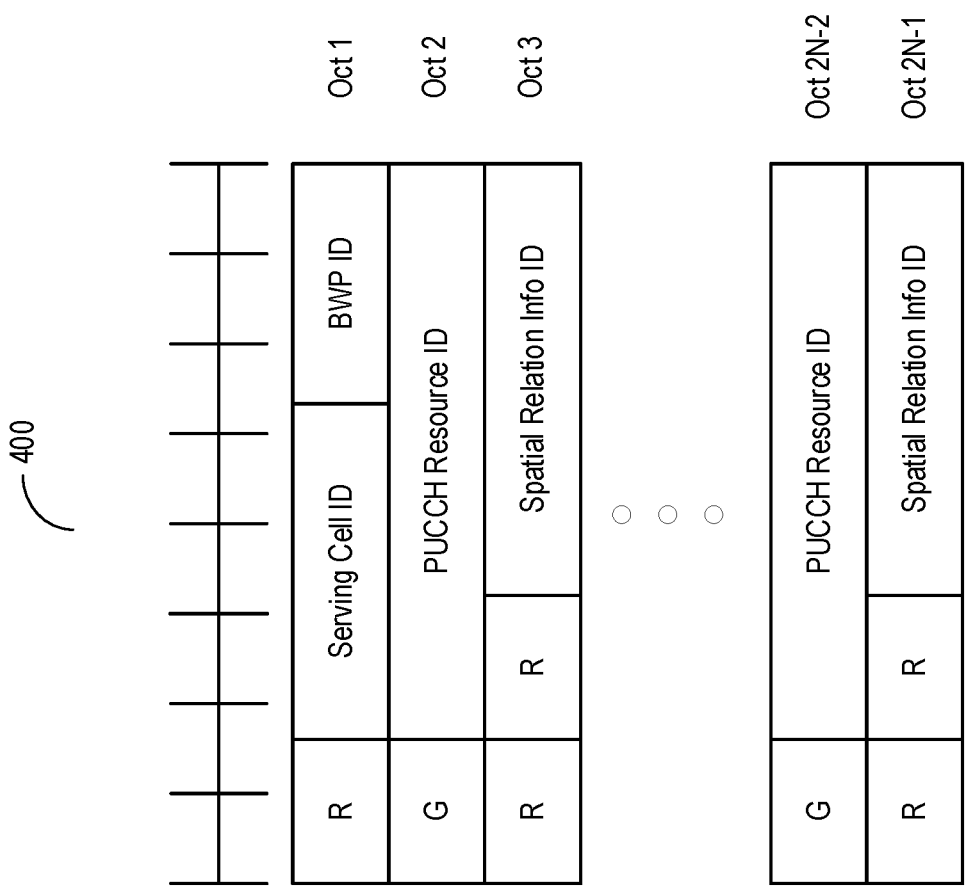
FIG. 4 illustrates a block diagram of an enhanced physical uplink control channel (PUCCH) spatial relation activation or deactivation media access control, control element (MAC-CE) in accordance with an illustrative embodiment.

Referring now to FIG. 4, depicted is a block diagram of an enhanced physical uplink control channel (PUCCH) spatial relation activation or deactivation media access control, control element (MAC-CE) 400. As depicted, in the case when the number of PUCCH groups M is 2, 1 bit G may be used to indicate PUCCH group ID (0 or 1). It is noted that R may be reserved bit, and not used. In the MAC-C3 400, 1 bit G may be inserted in the octet with PUCCH resource ID (e.g., Octet 2, . . . and 2N-2). The 1 bit G may be inserted before bits for PUCCH Resource ID, and it may be the first bit in the octet.

Figure 5:
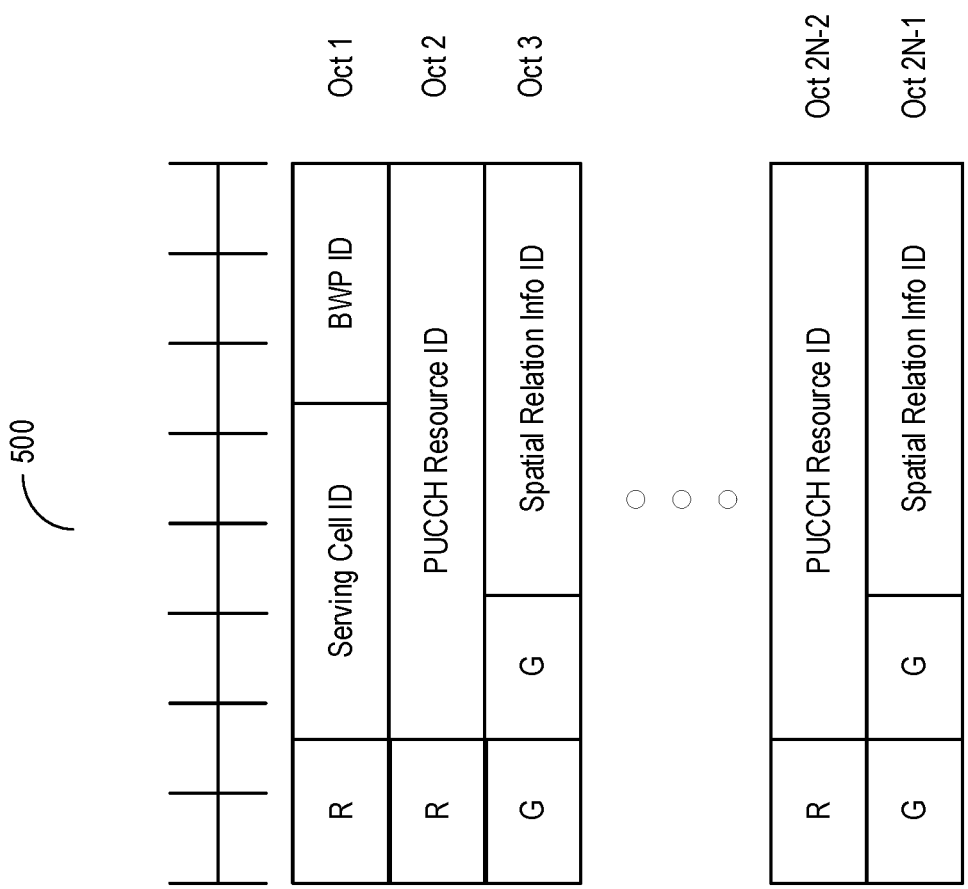
FIG. 5 illustrates a block diagram of an enhanced physical uplink control channel (PUCCH) spatial relation activation or deactivation media access control, control element (MAC-CE) with 1 bit G in accordance with an illustrative embodiment.

Referring now to FIG. 5, depicted is a block diagram of an enhanced physical uplink control channel (PUCCH) spatial relation activation or deactivation media access control, control element (MAC-CE) 500 with 1 bit G. In the case when the number of PUCCH groups M is 4, 2 bits G may be used to indicate PUCCH group ID (value 0, 1, 2, or 3). As shown, 2 bits G may be inserted in the octet with Spatial Relation Info ID (e.g., Octet 3, . . . and 2N-1). The two bits G may be inserted before bits for Spatial Relation Info ID. The bits may be the first two bits in the octet.

Figure 6:
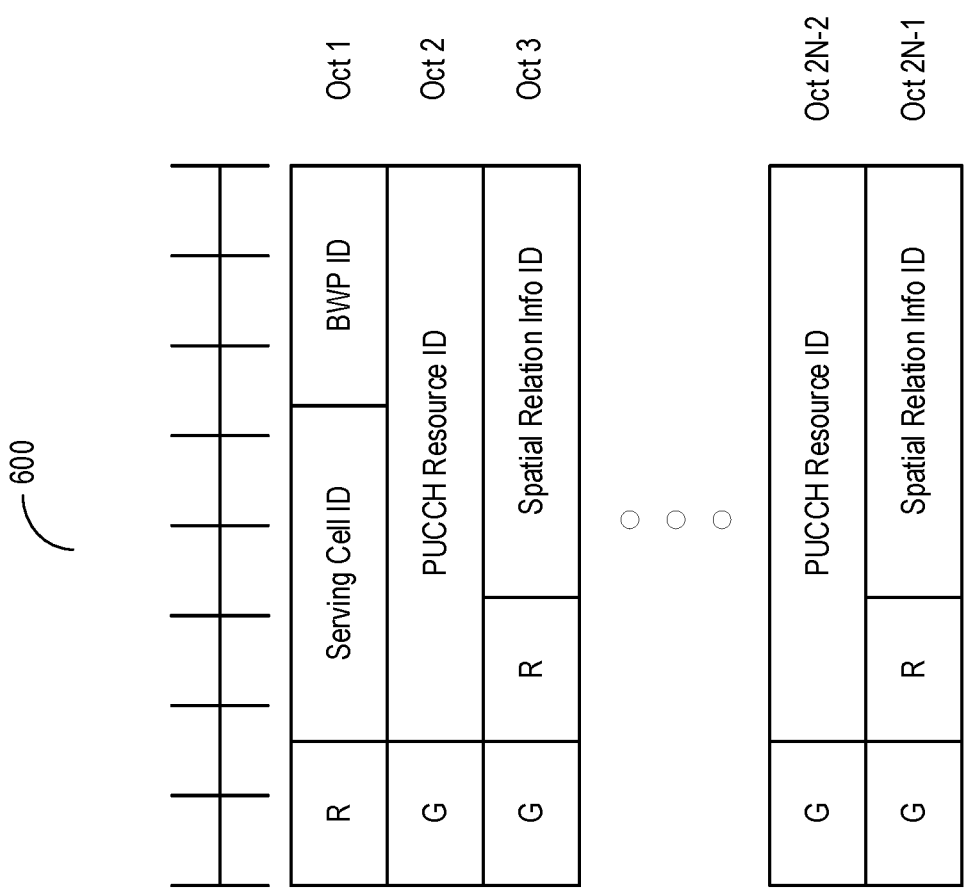
FIG. 6 illustrates a block diagram of an enhanced physical uplink control channel (PUCCH) spatial relation activation or deactivation media access control, control element (MAC-CE) with 2 bit G in accordance with an illustrative embodiment.

Referring now to FIG. 6, depicted is a block diagram of an enhanced physical uplink control channel (PUCCH) spatial relation activation or deactivation media access control, control element (MAC-CE) 600 with 2 bit G. As shown, 1 bit G may be inserted in the octet with PUCCH resource ID. This 1 bit G may be inserted before bits for PUCCH Resource ID and it may be the first bit in the octet. The other bit G may be inserted in the octet with Spatial Relation Info ID. This 1 bit G may be inserted before bits for Spatial Relation Info ID, can be either the first bit or the second bit in the octet.

Figure 7A:
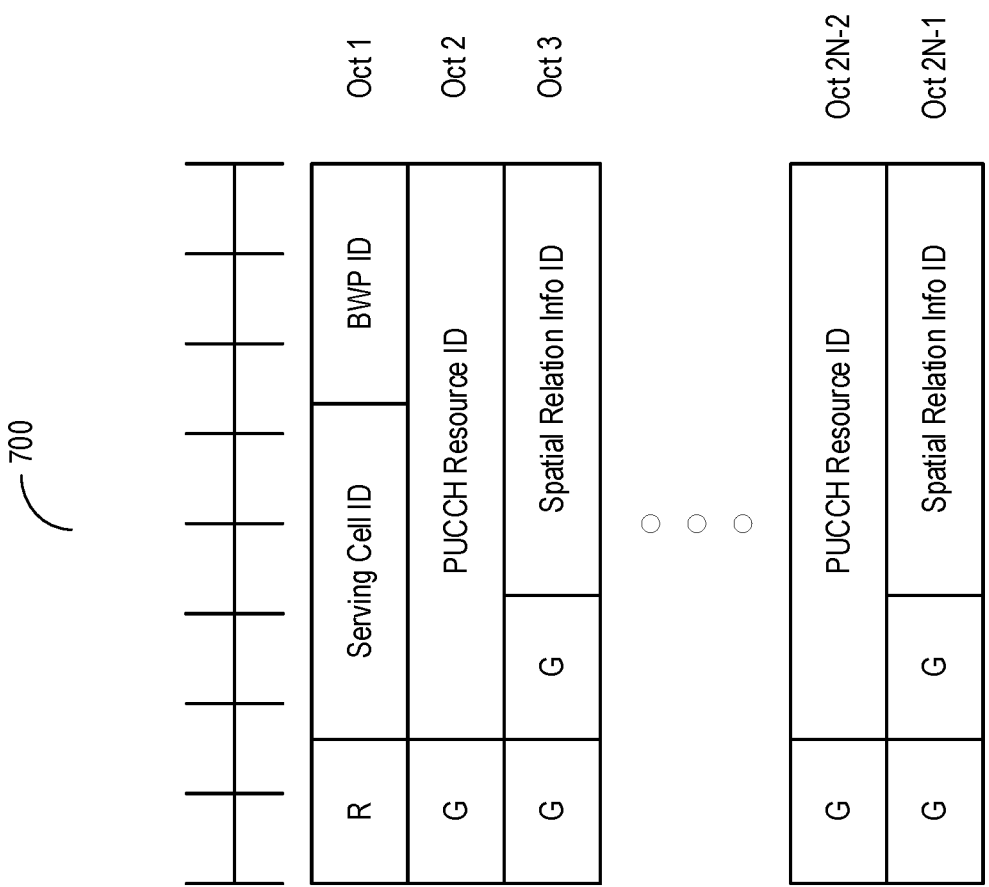
FIGS. 7A and 7B each illustrate a block diagram of an enhanced physical uplink control channel (PUCCH) spatial relation activation or deactivation media access control, control element (MAC-CE) with 3 bit G in accordance with an illustrative embodiment.

Referring now to FIG. 7A, depicted is a block diagram of an enhanced physical uplink control channel (PUCCH) spatial relation activation or deactivation media access control, control element (MAC-CE) 700 with 3 bit G. In the case when the number of PUCCH groups M is 8, 3 bits G may be used to indicate PUCCH group ID (value 0-7). As shown, 1 bit G may be inserted in the octet with PUCCH resource ID. This 1 bit G may be inserted before bits for PUCCH Resource ID. The other 2 bits G may be inserted in the octet with Spatial Relation Info ID (inserted before bits for Spatial Relation Info ID).

In the MAC CE, the same PUCCH Resource ID can be present at most B times which corresponds to B PUCCH groups or B beams respectively, wherein Spatial Relation Info ID can be different for the PUCCH Resource ID. The PUCCH group ID may be indicated by G value. B may be also equal to the number of beams for a PUCCH resource #i which is configured in B PUCCH resource groups.

Figure 7B:
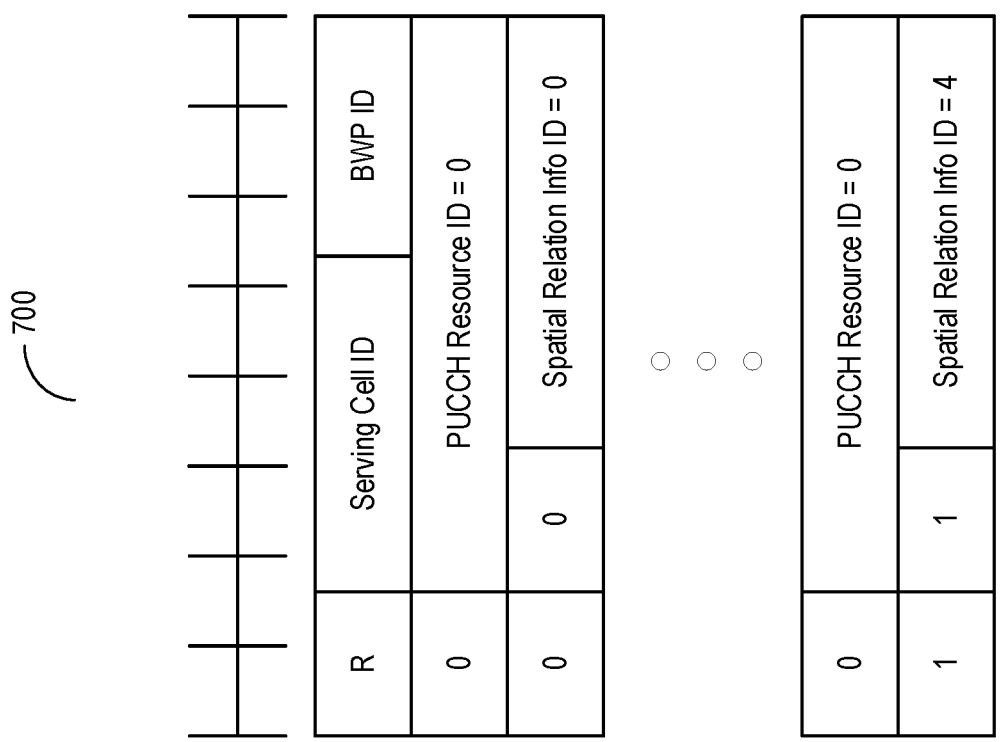

Referring now to FIG. 7B, depicted is a block diagram of an enhanced physical uplink control channel (PUCCH) spatial relation activation or deactivation media access control, control element (MAC-CE) 700 with 3 bit G with set values. For example as illustrated, B=2 beams (Spatial Relation info ID=0 and 4) may be activated or updated for PUCCH resource with PUCCH Resource ID=0. In such case, these two beams may be for PUCCH group 0 (3 bits G value is 000) and for PUCCH group 3 (3 bits G value is 011) respectively. Since PUCCH resource 0 is included in both PUCCH resource group 0 and group 3, it may have two updated beams.

2. Using PUCCH Resource ID and Relative PUCCH Resource Group ID in MAC-CE

In some embodiments, both PUCCH resource ID and a relative PUCCH resource group ID b may be introduced in a MAC CE to update or activate beam for one or more PUCCH resources. The relative PUCCH resource group ID b can be indicated by one dedicated bit in the octet with PUCCH Resource ID or one or two dedicated bits in the octet with Spatial Relation Info ID. The dedicated bit in the octet with PUCCH resource ID may be positioned before bits for PUCCH Resource ID. The dedicated bit in the octet with Spatial Relation Info ID may be located before bits for Spatial Relation Info ID. The number of relative PUCCH resource groups for a PUCCH resource #i may be B, where the PUCCH resource #i can be configured within B PUCCH groups. The relative PUCCH resource group ID b may be used to identify which PUCCH resource groups the corresponding Spatial Relation Info ID is used, wherein the identified PUCCH resource groups should include the corresponding PUCCH resource ID.

For an instance, B is 2 (e.g., two groups), 1 bit G may be used to indicate the relative PUCCH group ID (0 or 1). G=0 may indicate that the informed Spatial Relation Info ID is to be used for the first PUCCH resource group containing the corresponding PUCCH Resource ID. G=1 may indicate the Spatial Relation Info ID is to be used for the second PUCCH resource group containing the corresponding PUCCH Resource ID. If a PUCCH resource is only configured within one PUCCH resource group, the G value can be ignored since the PUCCH resource group ID can be identified by the PUCCH resource ID uniquely.

Figure 8:
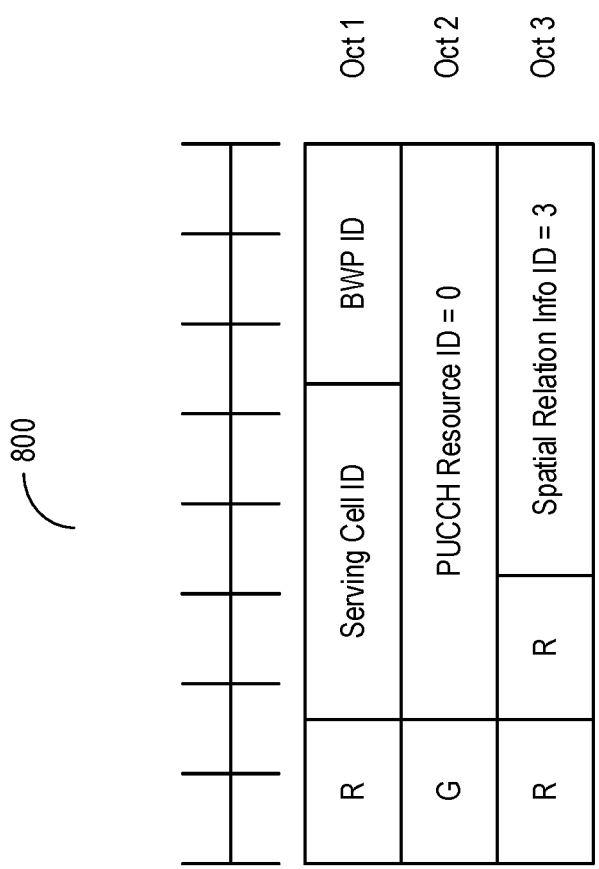
FIG. 8 illustrates a block diagram of an enhanced physical uplink control channel (PUCCH) spatial relation activation or deactivation media access control, control element (MAC-CE) with relative group identifier (ID) in accordance with an illustrative embodiment.
Figure 9:
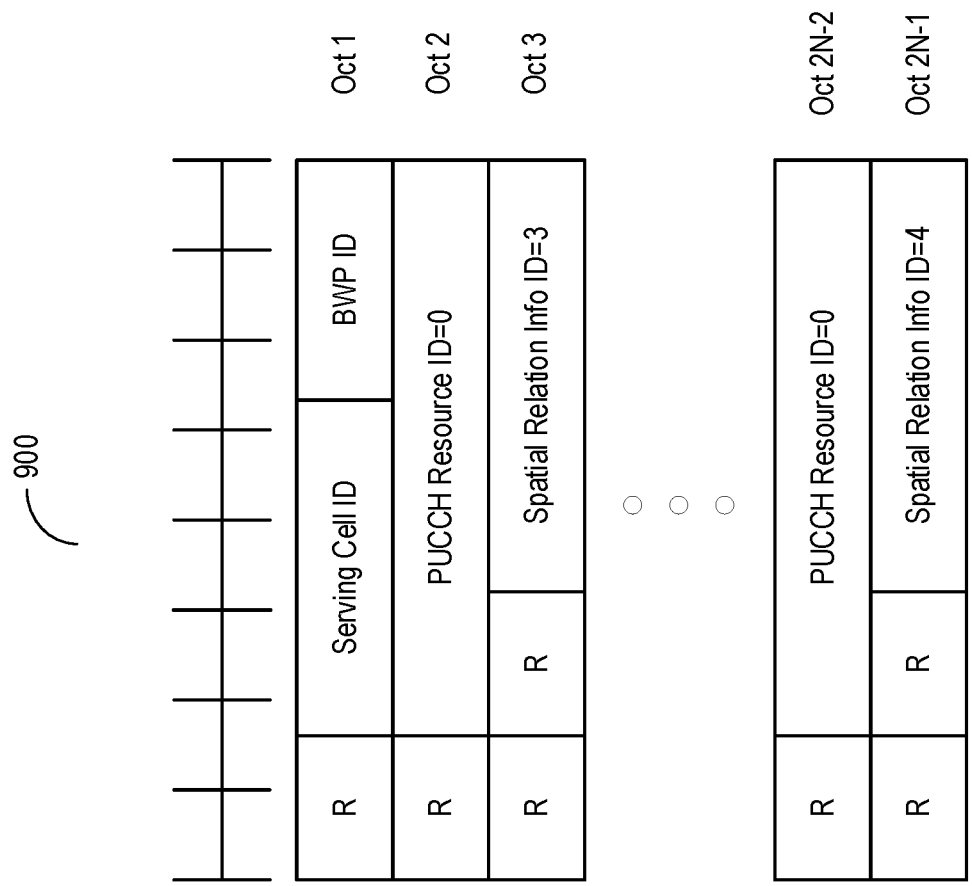
FIG. 9 illustrates a block diagram of an enhanced physical uplink control channel (PUCCH) spatial relation activation or deactivation media access control, control element (MAC-CE) with multiple relative group identifiers (IDs) in accordance with an illustrative embodiment.

Referring now to FIG. 8, depicted is a block diagram of an enhanced physical uplink control channel (PUCCH) spatial relation activation or deactivation media access control, control element (MAC-CE) 800 with relative group identifier (ID). Assuming four PUCCH resource groups may be configured by RRC signaling, M=4, the PUCCH resource groups may be the following:

PUCCH resource group 0 {resource 0, 1, 2, 3}
PUCCH resource group 1 {resource 4, 5}
PUCCH resource group 2 {resource 0, 6, 7, 8}
PUCCH resource group 3 {resource 9, 10}

PUCCH resource 0 may be configured in both PUCCH resource group 0 and group 2. In such case, G=0 may indicate that the Spatial Relation Info with ID=3; is to be used for all PUCCH resources within PUCCH group 0. As such, the first beam, that is (G+1)th beam for the PUCCH resource 0 may be activated or updated as the Spatial Relation Info with ID=3 in the case G=0. G=1 may indicate the Spatial Relation Info with ID=3 is to be used for all PUCCH resources within PUCCH group 2. As such the second beam, that is (G+1)th beam for the PUCCH resource 0 may be activated or updated as Spatial Relation Info with ID=3 in the case G=1.

In some embodiments, even when PUCCH resources are not grouped by RRC signaling, the MAC CE can still carry an identifier G for a PUCCH resource to indicate the corresponding beam in MAC CE is to activate or replace or update the (G+1)th beam of the PUCCH resource. As shown in FIG. 8, G=0 may indicate that the Spatial Relation Info with ID=3 is to be used for the first beam, that is (G+1)th beam for the PUCCH resource 0. G=1 may indicate the Spatial Relation Info with ID=3 is to be used for the second beam, that is (G+1)th beam for the PUCCH resource 0. In the MAC CE, the same PUCCH Resource ID, corresponding beam and identifier G can be present at most B times which corresponds to B beams of the PUCCH resource respectively.

3. Omitting Group ID from MAC-CE

In some embodiments, no group ID may be introduced in MAC CE. In the case when a PUCCH resource #i is configured within multiple PUCCH resource groups by RRC signaling, the first octet with PUCCH resource ID=i in MAC CE may be for the first PUCCH resource group containing PUCCH resource #i. Furthermore, the activated/updated beam for the octet may be used for all PUCCH resources within this first PUCCH resource group. The second octet with PUCCH resource ID=i in MAC CE may be for the second PUCCH resource group containing the same PUCCH resource #i, the activated or updated beam for the octet may be used for all PUCCH resources within the second PUCCH resource group. In addition, the same mapping may be used if a PUCCH resource is configured within more than two PUCCH resource groups. In summary, a predefined rule may be that, if a PUCCH resource #i is included in multiple PUCCH resource groups and present in a MAC CE several times, the updated beams updated by the MAC CE for the resource #i and the PUCCH resource groups containing resource #i may be one-to-one mapping.

Referring now to FIG. 8, depicted is a block diagram of an enhanced physical uplink control channel (PUCCH) spatial relation activation or deactivation media access control, control element (MAC-CE) 900 with multiple relative group identifiers (IDs). As shown, assuming four PUCCH resource groups are configured by RRC signaling, the PUCCH resource groups may be as follows:

PUCCH resource group 0 {resource 0, 1, 2, 3}
PUCCH resource group 1 {resource 4, 5}
PUCCH resource group 2 {resource 0, 6, 7, 8}
PUCCH resource group 3 {resource 9, 10}

PUCCH resource 0 is configured in both PUCCH resource group 0 and group 2. Thus, it is predefined that, the Spatial Relation Info with ID=3 is used for all PUCCH resources within PUCCH group 0. And the Spatial Relation Info with ID=4 is used for all PUCCH resources within PUCCH group 2.

B, Multiple beam Transmission in Frequency Range 1 (FR1)

As previously discussed, for FR2, a list of beams denoted as a list of spatial relation info may be configured by RRC signaling. With the configuration, one or more beams may be activated or updated for each PUCCH resource or resource group. In contrast, in FR1, there may be no consideration of analog beams for PUCCH resources. Thus, spatial relation information or beam may not be configured by RRC signaling or activated or updated by MAC CE for each PUCCH resource or PUCCH resource group. In such case, the reference signal in spatial relation information for beam identification may not be relied upon. However, configurations for power control, including path-loss reference RS, p0 and/or closed loop index, may be factored in.

Therefore, in FR1, even if a set of PUCCH Pathloss Reference (RS), a set of p0, and multiple closed loop indices may be configured by RRC signaling, the first values in these power control parameter sets may be used by default (denoted as the first candidate group of power control parameters) for single beam transmission since there may be no spatial relation information configured. In other words, the first pathloss reference RS (pucch-PathlossReferenceRS-Id with index 0), p0 (p0-PUCCH-Id value equal to the minimum p0-PUCCH-Id value in p0-Set) and closed loop index 0 may be used in FR1 for all PUCCH resources for a UE. In order to support multiple beam (maybe digital beam in FR1) PUCCH transmission with separate power control for multiple beams in FR1, several schemes may be considered as follows.

1. Configuring Candidate Group of Power Control Parameters Scheme

In some embodiments, a second candidate group of power control parameters may be configured by RRC signaling, including a pathloss reference RS, a p0 and/or a close loop index. Further, for each PUCCH resource or PUCCH resource group, a RRC signaling or MAC CE may be used to link one or more of the first and the second candidate group of power control parameters (to each resource or resource group).

For instance, the first candidate group of power control parameters may be predefined with {a PUCCH pathloss reference RS Id=0, p0 Id=0, closed loop index=0}, and the second candidate group of power control parameters may be configured with {a PUCCH pathloss reference RS Id=1, p0 Id=1, closed loop index=1}. For each PUCCH resource or resource group, a RRC signaling or MAC CE may be used to indicate one of three cases:

Under the first case, the PUCCH resource may be linked with the first candidate group of power control parameters. Specifically, the PUCCH resource power control may be based on {a PUCCH pathloss reference RS Id=0, p0 Id=0, closed loop index=0}. This may be a single beam transmission. The transmit power of all occasions and frequency hops of this PUCCH resource indicated by a scheduling grant (a DCI or configured grant) may be the same.

Under the second case, the PUCCH resource may be linked with the second candidate group of power control parameters. Specifically, the PUCCH resource power control may be based on {a PUCCH pathloss reference RS Id=1, p0 Id=1, closed loop index=1}. This also may be single beam transmission. The transmit power of all occasions and frequency hops of this PUCCH resource indicated by a scheduling grant (a DCI or configured grant) may be the same Under the third case, the PUCCH resource may be linked with both the first and the second candidate groups of power control parameters. This may be a multi-beam transmission. All occasions and frequency hops of this PUCCH resource indicated by a scheduling grant (a DCI or configured grant) may be divided into two parts corresponding to the first and the second candidate groups of power control parameters respectively. The first part of PUCCH occasions and frequency hops may be based on {a PUCCH pathloss reference RS Id=0, p0 Id=0, closed loop index=0} and the second part of PUCCH occasions and frequency hops may be based on {a PUCCH pathloss reference RS Id=1, p0 Id=1, closed loop index=1}

The RRC signaling or MAC CE can include 3 states (value 0, 1 and 2) to indicate the first candidate group of power control parameters (as in the first case), the second candidate group of power control parameters (as in the second case), or both (as in the third case) respectively.

2. Predefining Candidate Group of Power Control Parameters Scheme

In some embodiments, the second candidate group of power control parameters may be predefined to include some values, such as the second or last value in those power control parameter sets (e.g., the set of PUCCH Pathloss Reference RS, the set of p0, and multiple closed loop indices are configured by RRC signaling) by default in FR1 (e.g., no Spatial relation information may be configured). Then, there may be no additional RRC signaling to configure the second candidate group of power control parameters.

For example, the second candidate group of power control parameters may be predefined to include the second pathloss reference RS (pucch-PathlossReferenceRS-Id with index 1), p0 (p0-PUCCH-Id value equal to the second minimum p0-PUCCH-Id value in p0-Set) and close loop index 1 if more than one closed loop indices are configured. If the number of closed loop indices is 1, close loop index 0 may be used for both the first and the second candidate group of power control parameters.

Under the first and second schemes, if grouping of PUCCH resources is configured, two PUCCH resource groups may be sufficient. One may correspond to the first candidate group of power control parameters, the other may correspond to the second candidate group of power control parameters. In each PUCCH resource group, all PUCCH resources may share the same candidate group of power control parameters. If one PUCCH resource is included in both PUCCH resource groups, then the PUCCH resource may correspond to both candidate groups of power control parameters. It is noted that, the first candidate group of power control parameters can also be configured by RRC signaling.

3. Using Cyclic and Sequential Mapping for Each PUCCH Resource Schemes

In the previous schemes, for each PUCCH resource or PUCCH resource group, a RRC signaling or MAC CE may be used to indicate one of three cases. One enhancement may be to include 4 states (e.g. value 0, 1, 2, 3) to indicate the first candidate group of power control parameters and the second candidate group of power control parameters, both with cyclic mapping or sequential mapping for each PUCCH resource.

Under cyclic mapping, the first PUCCH occasion or frequency hop may be scheduled by a scheduling grant links to the first candidate group of power control parameters. The second PUCCH occasion or frequency hop may be scheduled by the scheduling grant links to the second candidate group of power control parameters. The third PUCCH occasion or frequency hop (if any scheduled by the scheduling grant) may link to the first candidate group of power control parameters. Likewise, the fourth PUCCH occasion or frequency hop (if any scheduled by the scheduling grant) may link to the second candidate group of power control parameters. The same mapping may be used for all remaining PUCCH occasion/frequency hops if any.

Under sequential mapping, the first and second PUCCH occasions or frequency hops may be scheduled by a scheduling grant links to the first candidate group of power control parameters. The third and fourth PUCCH occasions or frequency hops may be scheduled by the scheduling grant links to the second candidate group of power control parameters. The same mapping may be used for all remaining PUCCH occasion or frequency hops if any. In some embodiments, if the number of PUCCH occasions or frequency hops are two, cyclic mapping can be used, even when sequential mapping is configured.

4. Configuring Multiple Candidate Groups of Power Control Parameters Scheme

In some embodiments, multiple candidate groups of power control parameters may be configured by RRC signaling to include a pathloss reference RS, a p0 and/or a close loop index for each candidate group. For each PUCCH resource or PUCCH resource group, a RRC signaling or MAC CE may be used to link one or more of all candidate groups of power control parameters (for each PUCCH resource). All the candidate groups may include or may not include the first candidate group since the first candidate group may contain the first values of RRC configured power control parameters by default.

Figure 10:
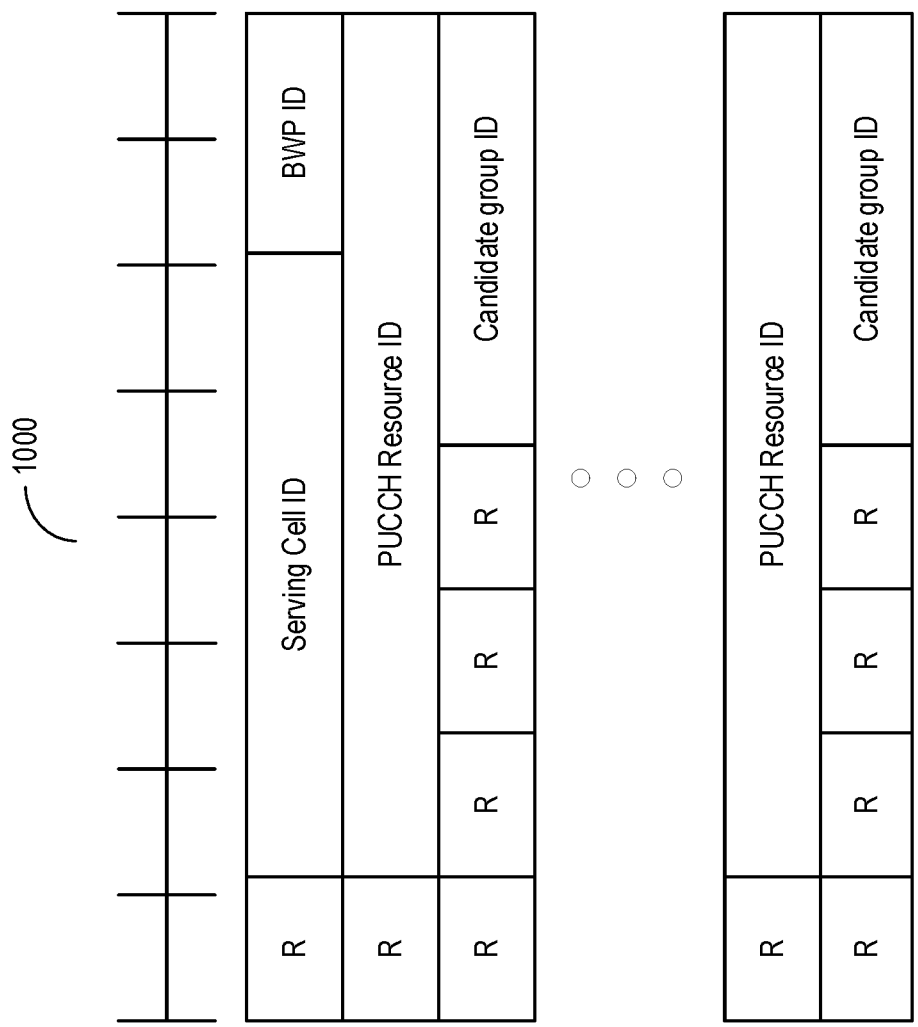
FIG. 10 illustrates a block diagram of multiple candidate groups in media access control, control element (MAC-CE) to update power control parameters for each physical uplink control channel (PUCCH) resource in accordance with an illustrative embodiment.

Referring now to FIG. 10, depicted is a block diagram of multiple candidate groups in media access control, control element (MAC-CE) 1000 to update power control parameters for each physical uplink control channel (PUCCH) resource. In the depicted example, 16 candidate groups of power control parameters are configured by RRC signaling, 4 bits in a MAC CE is needed to indicate a candidate group ID for each PUCCH resource. In such case, one PUCCH resource ID can be present M>1 times in a MAC-CE, meaning that the PUCCH resource is to be updated or activated with M candidate groups of power control parameters. If PUCCH resource grouping is configured, the approach may be the same as the FR2 scenarios described above, except that Spatial Relation info ID may be replaced by Candidate group ID here).

5. Configuration Using Virtual Spatial Relation Information Scheme

In some embodiments, a candidate group of power control parameters may be configured by a RRC signaling referred to as virtual PUCCH spatial relation information. In each virtual PUCCH spatial relation information, only power control parameters including path loss reference RS, p0 or closed loop index may be configured. The virtual PUCCH spatial relation info ID may also be included. The reference signal (RS) for beam information may not be configured in virtual PUCCH spatial relation information. Under this scheme, all other signaling design, such as PUCCH resource grouping, use of MAC CE to update PUCCH beams, can be shared for FR1 and FR2.

Figure 11:
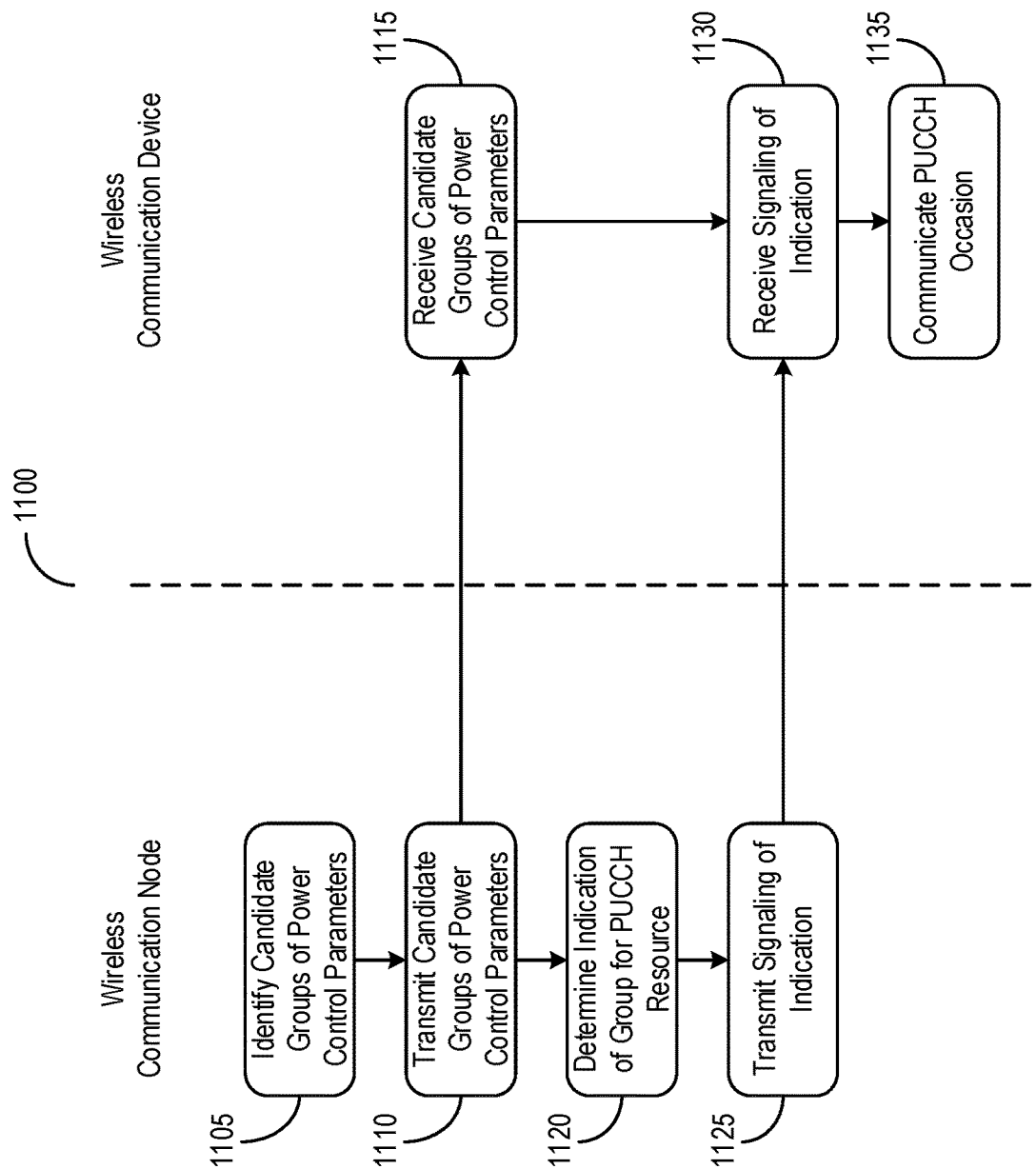
FIG. 11 illustrates a flow diagram of a method for multi-beam transmission signaling for physical uplink control channel (PUCCH) in accordance with an illustrative embodiment.

C. Process for Multi-Beam Transmission Signaling for Uplink (UL) Communication Channels Referring now to FIG. 11, depicted is a flow diagram of a method 1100 for multi-beam transmission signaling for physical uplink control channel (PUCCH). The method 1100 may be implemented by or performed using any of the components discussed above, such as the BS 102, UE 104, BS 202, or UE 204, among others. In brief overview, a wireless communication node may identify candidate groups of power control parameters (1105). The wireless communication node may transmit candidate groups of power control parameters (1110). A wireless communication device may receive the candidate groups of power control parameters (1115). The wireless communication node may determine an indication of a group for PUCCH resource (1120). The wireless communication node may transmit a signaling of the indication (1125). The wireless communication device may receive the signaling of the indication (1130). The wireless communication device may communicate a PUCCH occasion (1135).

In further detail, a wireless communication node (e.g., BS 102 or 202) may determine, configure, or otherwise identify B candidate groups of power control parameters (1105). Each group of power control parameters may be associated with or linked to a corresponding PUCCH resource. Each group of power control parameters may include one or more values for various power control values (e.g., pathloss reference signal (RS), p0, alpha, and closed loop indices) for PUCCH communication with the wireless communicate node. In some embodiments, at least one candidate group of power control parameters (e.g., the b-th candidate group) may be configured by higher layer signaling (e.g., radio resource control (RRC) signaling). In some embodiments, at least one candidate group of power control parameters may include at least one predefined value (e.g., b-th predefined value) from each of a plurality of sets of configured power control parameters. Each set of configured power control parameters may include a set of values for a set of pathloss reference signals (RS), p0 identifiers, an alpha indices, or a set of closed loop indices, among other parameters. For the groups, B may be an integer greater than or equal to 1 and b may be an integer greater than or equal to one and small than or equal to B. In some embodiments, at least one PUCCH resource may be configured in B PUCCH resource groups from M PUCCH resource groups. Here, M may be greater than or equal to B. Each of the M PUCCH resource groups may be associated with at least one of a same set of power control parameters or a same beam state.

The wireless communication node may send, provide, or otherwise transmit candidate B groups of power control parameters to a wireless communication device (e.g., UE 104 or 204) (1110). In some embodiments, the wireless communication node may configure the B candidate groups of power control parameters on the wireless communication device via higher layer signaling (e.g., RRC) or media access control, control element (MAC-CE). The wireless communication device may retrieve, identify, or otherwise receive the candidate groups of power control parameters from the wireless communication node (1115). In some embodiments, the wireless communication device may be configured with the B candidate groups of power control parameters by the wireless communication node via he higher layer signaling or the MAC-CE.

The wireless communication node may identify or determine an indication of a group for PUCCH resource (1120). The indication may include one of a set of values (e.g., integer value or index value) to signal or direct the wireless communication device to select the candidate groups of power control parameters. The value of the indication may be one of three values corresponding to one or more of a first candidate group and a second candidate group, among others, from the B candidate groups of power control parameters. In some embodiments, the value may indicate that a subset or all of the PUCCH transmission instances (e.g., a frequency hop or occasion) are to be associated with a particular candidate group of power control parameters. In some embodiments, the first value may indicate that all PUCCH transmission instances of the first PUCCH resource are associated with the first candidate group of power control parameters. In some embodiments, the second value may indicate that all PUCCH transmission instances of the first PUCCH resource are associated with the second candidate group of power control parameters. In some embodiments, the third value may indicate that a first subset of PUCCH transmission instances of the first PUCCH resource are associated with the first candidate group of power control parameters, and a second subset of PUCCH transmission instances of the first PUCCH resource are associated with the second candidate group of power control parameters.

The wireless communication node may send, provide, or otherwise transmit a signaling of the indication to the wireless communication device (1125). The signaling may be to indicate the B candidate groups of power control parameters for a PUCCH resource to be used in communications with the wireless communication node. In some embodiments, the signaling may include the indication of one of the set of values to direct the wireless communication device to select the B candidate groups of power control parameters for a PUCCH resource. In some embodiments, the wireless communication node may transmit via a higher layer signaling (e.g., RRC) to the wireless communication device. In some embodiments, the wireless communication node may transmit via a MAC-CE signaling (e.g., MAC-CE 400, 500, 600, 700, 800, 900, or 1000). The MAC-CE signaling may include, contain, or otherwise carry an identifier G for a PUCCH resource. In some embodiments, the identifier G may include a bit in an octet that includes an identifier (ID) of the PUCCH resource. In some embodiments, the identifier G may include a bit in another octet that includes a spatial relation information identifier (ID) for the PUCCH resource. The identifier G may reference or identify a (G+1)th candidate group from the B candidate groups of power control parameters, or a (G+1)th beam state from B beam states. Here, G may be a non-negative integer smaller than B. In some embodiments, the identified (G+1)th candidate group of power control parameters or the identified (G+1)th beam state may be used for all PUCCH resources of a (G+1)th PUCCH resource group from the B PUCCH resource groups. The B PUCCH resource groups may include the first PUCCH resource.

The wireless communication device may retrieve, identify, or otherwise receive the signaling of the indication from the wireless communication node (1130). In some embodiments, the wireless communication device may receive via a higher layer signaling (e.g., RRC) to the wireless communication node. In some embodiments, the wireless communication device may receive via the MAC-CE signaling to the wireless communication node. Upon receipt, the wireless communication device may parse the signaling to extract or identify the value of the indication for the PUCCH resource. Based on the identified value, the wireless communication device may identify or select one or more candidate groups of power control parameters. The wireless communication device may further identify or select one or more PUCCH transmission instances of the PUCCH resource associated with the one or more candidate groups of power control parameters.

The wireless communication device may communicate a PUCCH occasion with the wireless communication node (1135). The wireless communication device may have aggregated or received the candidate groups of power control parameters and signaling from one or more wireless communication devices. With the identification of the candidate groups of power control parameters and PUCCH transmission instances, the wireless communication device may communicate the PUCCH occasion or frequency hop in accordance with the PUCCH resource. The communication of one PUCCH occasion (or frequency hop) may be with one wireless communication node and the communication of another PUCCH occasion (or frequency hop) may be with another wireless communication node.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
   receiving, by a wireless communication device from a wireless communication node, B candidate groups of power control parameters,
   receiving, by the wireless communication device from the wireless communication node, a medium access control element (MAC CE) signaling carrying an identifier to indicate a candidate group from the B candidate groups of power control parameters for a first physical uplink control channel (PUCCH) resource, wherein B is an integer greater than or equal to 1, wherein the receiving comprises: receiving, by the wireless communication device from the wireless communication node, the MAC CE signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B; and communicating, by the wireless communication device, a PUCCH occasion in accordance with the first PUCCH resource, the first PUCCH resource associated with the candidate group.

2. The method of claim 1, wherein a $b^{th}$ candidate group of power control parameters, from the B candidate groups, is at least one of:
configured by higher layer signaling, or
includes a $b^{th}$ predefined value from each of a plurality of sets of configured power control parameters,
wherein b is an integer greater than or equal to 1, and smaller than or equal to B, and each of the plurality of sets of the configured power control parameters corresponds to a set of pathloss reference signals (RSs), a set of p0 values, or a set of closed loop indices.

3. The method of claim 1, wherein the MAC CE signaling indicates one of at least three values, the three values corresponding to a first candidate group, a second candidate group, or both the first candidate group and the second candidate group, from the B candidate groups of power control parameters, wherein:
a first value indicates that all PUCCH transmission instances of the first PUCCH resource are associated with the first candidate group of power control parameters,
a second value indicates that all PUCCH transmission instances of the first PUCCH resource are associated with the second candidate group of power control parameters, and
a third value indicates that a first subset of PUCCH transmission instances of the first PUCCH resource are associated with the first candidate group of power control parameters, and a second subset of PUCCH transmission instances of the first PUCCH resource are associated with the second candidate group of power control parameters.

4. The method of claim 1, wherein the first PUCCH resource is configured in B PUCCH resource groups from M PUCCH resource groups, wherein M is greater than or equal to B, and each of the M PUCCH resource groups is associated with at least one of: same power control parameters, or a same beam state.

5. The method of claim 1, wherein the identified (G+1)th candidate group of power control parameters or the identified (G+1)th beam state is used for all PUCCH resources of a (G+1)th PUCCH resource group from the B PUCCH resource groups, that includes the first PUCCH resource.

6. The method of claim 1, wherein the identifier G includes at least one of:
a bit in an octet that includes an identifier (ID) of the first PUCCH resource, or
a bit in another octet that includes a spatial relation information ID for the first PUCCH resource.

7. A method comprising:
transmitting, by a wireless communication node to a wireless communication device, B candidate groups of power control parameters,
transmitting, by the wireless communication node to the wireless communication device, a medium access control element (MAC CE) signaling carrying an identifier to indicate a candidate group from the B candidate groups of power control parameters for a first physical uplink control channel (PUCCH) resource, wherein B is an integer greater than or equal to 1, wherein the transmitting comprises: transmitting, by the wireless communication node to the wireless communication device, the MAC CE signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B; and
causing the wireless communication device to communicate a PUCCH occasion in accordance with the first PUCCH resource, the first PUCCH resource associated with the candidate group.

8. The method of claim 7, wherein a $b^{th}$ candidate group of power control parameters, from the B candidate groups, is at least one of:
configured by higher layer signaling, or
includes a $b^{th}$ predefined value from each of a plurality of sets of configured power control parameters,
wherein b is an integer greater than or equal to 1, and smaller than or equal to B, and each of the plurality of sets of the configured power control parameters corresponds to a set of pathloss reference signals (RSs), a set of p0 values, or a set of closed loop indices.

9. The method of claim 7, wherein the MAC CE signaling indicates one of at least three values, the three values corresponding to a first candidate group, a second candidate group, or both the first candidate group and the second candidate group, from the B candidate groups of power control parameters, wherein:
a first value indicates that all PUCCH transmission instances of the first PUCCH resource are associated with the first candidate group of power control parameters,
a second value indicates that all PUCCH transmission instances of the first PUCCH resource are associated with the second candidate group of power control parameters, and
a third value indicates that a first subset of PUCCH transmission instances of the first PUCCH resource are associated with the first candidate group of power control parameters, and a second subset of PUCCH transmission instances of the first PUCCH resource are associated with the second candidate group of power control parameters.

10. The method of claim 7, wherein the first PUCCH resource is configured in B PUCCH resource groups from M PUCCH resource groups, wherein M is greater than or equal to B, and each of the M PUCCH resource groups is associated with at least one of: same power control parameters, or a same beam state.

11. The method of claim 7, comprising:
transmitting, by the wireless communication node to the wireless communication device, the MAC CE signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B.

12. The method of claim 11, wherein the identified (G+1)th candidate group of power control parameters or the identified (G+1)th beam state is used for all PUCCH resources of a (G+1)th PUCCH resource group from the B PUCCH resource groups, that includes the first PUCCH resource.

13. The method of claim 11, wherein the identifier G includes at least one of:
a bit in an octet that includes an identifier (ID) of the first PUCCH resource, or
a bit in another octet that includes a spatial relation information ID for the first PUCCH resource.

14. A wireless communication device comprising:
at least one processor configured to:
receive, via a receiver from a wireless communication node, B candidate groups of power control parameters,
receive, via the receiver from the wireless communication node, a medium access control element (MAC CE) signaling carrying an identifier to indicate a candidate group from the B candidate groups of power control parameters for a first physical uplink control channel (PUCCH) resource, wherein B is an integer greater than or equal to 1, which comprises receiving, via the receiver from the wireless communication node, the MAC CE signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B; and
communicate, via a transmitter, a PUCCH occasion in accordance with the first PUCCH resource, the first PUCCH resource associated with the candidate group.

15. The wireless communication device of claim 14, wherein a $b^{th}$ candidate group of power control parameters, from the B candidate groups, is at least one of:
configured by higher layer signaling, or
includes a $b^{th}$ predefined value from each of a plurality of sets of configured power control parameters,
wherein b is an integer greater than or equal to 1, and smaller than or equal to B, and each of the plurality of sets of the configured power control parameters corresponds to a set of pathloss reference signals (RSs), a set of p0 values, or a set of closed loop indices.

16. The wireless communication device of claim 14, wherein the MAC CE signaling indicates one of at least three values, the three values corresponding to a first candidate group, a second candidate group, or both the first candidate group and the second candidate group, from the B candidate groups of power control parameters, wherein:
a first value indicates that all PUCCH transmission instances of the first PUCCH resource are associated with the first candidate group of power control parameters,
a second value indicates that all PUCCH transmission instances of the first PUCCH resource are associated with the second candidate group of power control parameters, and
a third value indicates that a first subset of PUCCH transmission instances of the first PUCCH resource are associated with the first candidate group of power control parameters, and a second subset of PUCCH transmission instances of the first PUCCH resource are associated with the second candidate group of power control parameters.

17. A wireless communication node comprising:
at least one processor configured to:
transmit, via a transmitter to a wireless communication device, B candidate groups of power control parameters,
transmit, via the transmitter to the wireless communication device, a medium access control element (MAC CE) signaling carrying an identifier to indicate a candidate group from the B candidate groups of power control parameters for a first physical uplink control channel (PUCCH) resource, wherein B is an integer greater than or equal to 1, which comprises transmitting, via the transmitter to the wireless communication device, the MAC CE signaling carrying an identifier G for identifying at least one of: a (G+1)th candidate group from the B candidate groups of power control parameters, or a (G+1)th beam state from B beam states, for the first PUCCH resource, wherein G is a non-negative integer smaller than B; and
cause the wireless communication device, to communicate a PUCCH occasion in accordance with the first PUCCH resource, the first PUCCH resource associated with the candidate group.

18. The wireless communication node of claim 17, wherein a $b^{th}$ candidate group of power control parameters, from the B candidate groups, is at least one of:
configured by higher layer signaling, or
includes a $b^{th}$ predefined value from each of a plurality of sets of configured power control parameters,
wherein b is an integer greater than or equal to 1, and smaller than or equal to B, and each of the plurality of sets of the configured power control parameters corresponds to a set of pathloss reference signals (RSs), a set of p0 values, or a set of closed loop indices.

19. The wireless communication node of claim 17, wherein the MAC CE signaling indicates one of at least three values, the three values corresponding to a first candidate group, a second candidate group, or both the first candidate group and the second candidate group, from the B candidate groups of power control parameters, wherein:
a first value indicates that all PUCCH transmission instances of the first PUCCH resource are associated with the first candidate group of power control parameters,
a second value indicates that all PUCCH transmission instances of the first PUCCH resource are associated with the second candidate group of power control parameters, and
a third value indicates that a first subset of PUCCH transmission instances of the first PUCCH resource are associated with the first candidate group of power control parameters, and a second subset of PUCCH transmission instances of the first PUCCH resource are associated with the second candidate group of power control parameters.

\* \* \* \* \*